(12) United States Patent
Toth

(10) Patent No.: US 10,351,349 B2
(45) Date of Patent: Jul. 16, 2019

(54) CHAIN RAIL UNLOADING SYSTEM

(71) Applicant: Keith Manufacturing Co., Madras, OR (US)

(72) Inventor: Tim Toth, Madras, OR (US)

(73) Assignee: Keith Manufacturing Co., Madras, OR (US)

( * ) Notice: Subject to any disclaimer, the term of this patent is extended or adjusted under 35 U.S.C. 154(b) by 0 days.

(21) Appl. No.: 16/140,979

(22) Filed: Sep. 25, 2018

(65) Prior Publication Data

US 2019/0023493 A1   Jan. 24, 2019

Related U.S. Application Data

(63) Continuation of application No. 14/586,553, filed on Dec. 30, 2014, now Pat. No. 10,087,011.

(60) Provisional application No. 61/922,735, filed on Dec. 31, 2013.

(51) Int. Cl.
| | |
|---|---|
| B65G 23/44 | (2006.01) |
| B65G 37/00 | (2006.01) |
| B65G 21/20 | (2006.01) |
| B65G 15/62 | (2006.01) |
| B65G 15/14 | (2006.01) |
| B65G 15/64 | (2006.01) |
| B65G 21/22 | (2006.01) |

(52) U.S. Cl.
CPC .......... B65G 23/44 (2013.01); B65G 15/14 (2013.01); B65G 15/62 (2013.01); B65G 15/64 (2013.01); B65G 21/20 (2013.01); B65G 21/22 (2013.01); B65G 37/005 (2013.01)

(58) Field of Classification Search
CPC ...... B65G 18/14; B65G 37/005; B65G 23/06; B65G 23/44; B65G 21/20; B65G 15/62; B65G 15/64
USPC .... 198/604, 605, 813–816, 834, 837, 836.1, 198/841
See application file for complete search history.

(56) References Cited

U.S. PATENT DOCUMENTS

| | | | | |
|---|---|---|---|---|
| 2,892,532 | A | * | 6/1959 | McCallum ............ B65G 21/04 116/67 R |
| 4,051,969 | A | | 12/1977 | Homanick |
| 4,164,283 | A | | 8/1979 | Flajnik |
| 4,239,102 | A | * | 12/1980 | Boltrek ................... B66B 23/04 198/336 |
| 4,358,010 | A | | 11/1982 | Besch |
| 4,556,143 | A | | 12/1985 | Johnson |
| 5,009,168 | A | * | 4/1991 | Kuchta .................. B65G 21/22 104/111 |
| 5,186,314 | A | | 2/1993 | Clopton |
| 5,190,145 | A | | 3/1993 | Ledginham et al. |
| 5,259,495 | A | | 11/1993 | Douglas |
| 6,200,036 | B1 | | 3/2001 | Girardey |
| 6,769,534 | B2 | | 8/2004 | Lee |
| 6,988,612 | B1 | | 1/2006 | Kabeshita |

(Continued)

OTHER PUBLICATIONS

"CargoMatic The Logistic Solution," dated Feb. 2016 (see accompanying transmittal letter).

*Primary Examiner* — Leslie A Nicholson, III
(74) *Attorney, Agent, or Firm* — Bruce A. Kaser

(57) ABSTRACT

An endless chain conveyor is disclosed having an endless chain that rides on a rail with sprockets at each end of the rail. The chain is installed on the rail in tension. The conveyor does not otherwise require an adjustment mechanism for taking the slack out of the chain after it is installed on the rail.

18 Claims, 9 Drawing Sheets

(56) References Cited

U.S. PATENT DOCUMENTS

| | | |
|---|---|---|
| 7,090,070 B2 | 8/2006 | Linder |
| 7,942,398 B1 | 5/2011 | Marcinik |
| 8,944,240 B2 | 2/2015 | Frederick |
| 9,969,560 B1 | 5/2018 | Toma |
| 2008/0298940 A1 | 12/2008 | Cleasby et al. |

\* cited by examiner

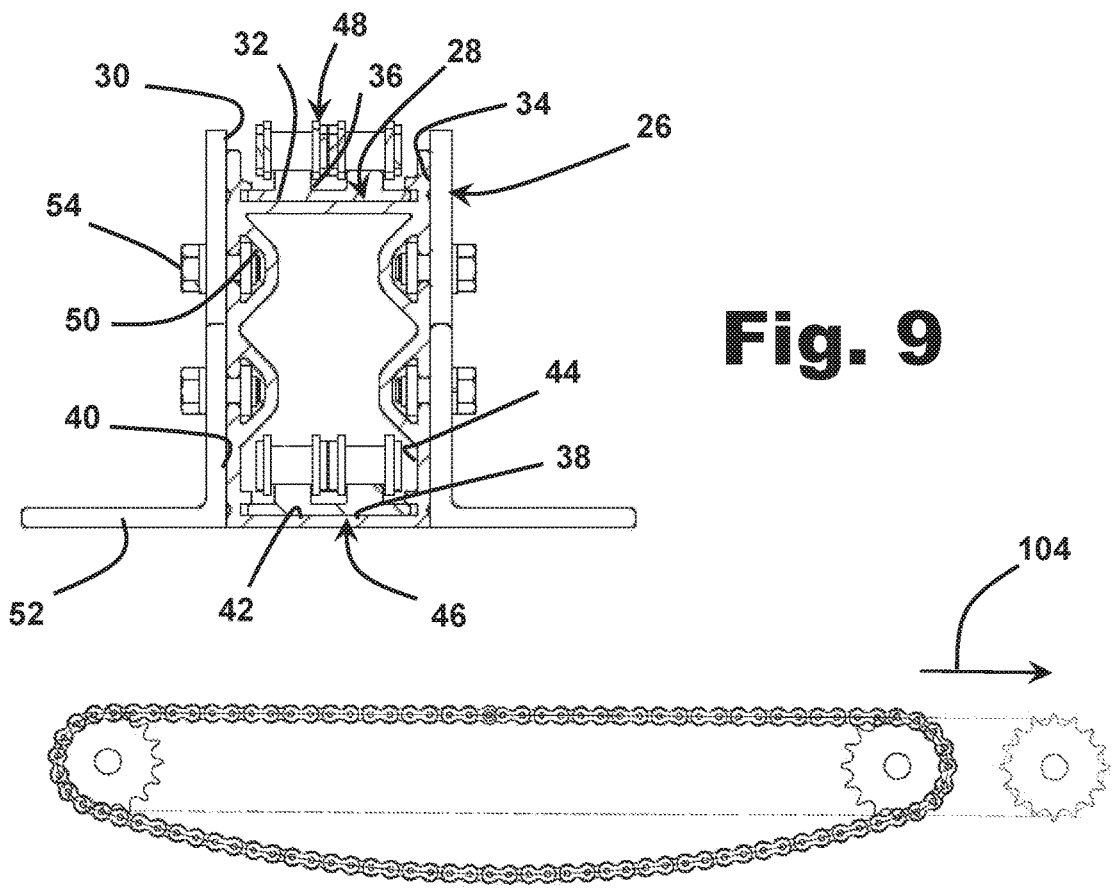
Fig. 9
Fig. 10
"PRIOR ART"
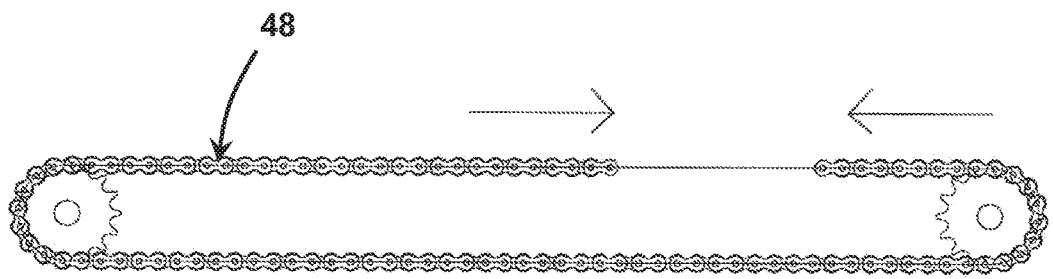
Fig. 11

CHAIN RAIL UNLOADING SYSTEM

TECHNICAL FIELD

The present disclosure relates to a chain rail loading/unloading system, and more particularly, to a chain rail loading system that is adapted to be installed on a pre-existing floor surface of a trailer or a floor surface in a warehouse.

BACKGROUND

Chain rail conveyor systems utilize an endless chain that travels on and around a rail. The chain provides a surface for carrying/moving a pallet or similar items in one direction or another above the rail, depending on the path of chain travel. The chain travels a circuit and returns underneath the rail It is common to employ chain tightening mechanisms that are built into each end of the rail. As an example, the rail may carry an end sprocket that can move/translate horizontally, in one direction or another via a tightening mechanism. As a skilled person would know, the moveable end sprocket, which carries the chain, normally enables the chain to reverse direction from the chain's path of travel from above the rail to below. Movement of the end sprocket, which is adjustable, enables slack to be taken out of the chain during the chain's installation on the rail. Conversely, the end sprocket allows slack to be put into the chain for chain removal or repair.

The tightening mechanism that enables sprocket movement typically employs a threaded bolt or shaft, or the like, that is designed to translate the end sprocket in one horizontal direction or another. The direction depends on whether the bolt is turned clockwise or counterclockwise. This type of arrangement is common and would be understood by a person skilled in the art.

The problem with the kind of tightening mechanism described above is that the mechanism adds mechanical structure to the end of the rail. What this means is that the rail has to be designed to accommodate or carry the tightening mechanism(s) for the rail and end sprockets. Among other things, the tightening mechanism may make it more difficult to design reduced-height chain rail systems.

The design disclosed here makes it possible to manufacture and supply chain rail systems that do not have end sprocket tightening mechanisms. The present design also includes other improvements to chain rail systems, which are described below.

SUMMARY

The present disclosure is a chain rail load conveyor system. In this case, the load conveyor system is an endless chain system. The system includes at least one elongated rail that is mountable to an existing flatbed surface. For the sake of example only, the existing flatbed surface could be a pre-existing trailer floor or a pre-existing surface in a warehouse building, or similar kind of surface. The present system is designed to be installed on top of the flatbed surface and can then be removed, subsequently, if needed. This is advantageous in situations where the user is installing the system on a leased trailer, where the system can be installed during the term of the lease and then removed before the trailer is returned to the owner.

The elongated rail has a fixed length upon installation. Generally speaking, and in the context of the above example, the rail will extend substantially from one end of a trailer to the other, corresponding to the volume of the trailer that will be loaded, and then unloaded, taking into account the rail drive system and other necessary components required for operation of the conveyor system.

In one implementation, it is possible that a single, continuous rail extrusion could be used for the length of the conveyor system. In another implementation, the rail could be constructed in segments that are butted together in end-to-end relationship to form a longer rail having the length desired. It is to be understood that, while the system is summarized here in the context of a single rail, a skilled person would know that rails are usually paired together to create a conveyor system, usually to move loaded pallets back-and-forth within the interior space of a trailer, or the like, during loading and unloading sequences.

The elongated rail disclosed here includes an upper chain-carrying track as well as a lower chain-carrying track. Regardless of whether the elongated rail is extruded as a single, long and continuous extrusion, or is otherwise constructed from segments, there will be a pair of guide sprockets adjacent to each end of the rail. These guide sprockets are "fixed" or, in other words, they are fixed position sprockets that do not have any mechanism or means for translating or otherwise adjusting or moving their position relative to the end of the rail. They are "non-adjustable."

The endless chain rides on the upper and lower tracks of the rail, and on the guide sprockets. The upper and lower tracks and the guide sprockets establish a perimeter path of travel that is followed by the endless chain when the chain moves to convey a load in one direction or another. The end sprockets guide the chain between the upper and lower tracks. The chain rides in the upper track in a manner that is sufficiently exposed so that pallets or another kind of load can ride on and be conveyed by the chain above the upper track (as the chain moves). The lower track provides a return path of travel for the chain. In this case, the rail is made of a hollow extrusion so that the lower track provides a return path of travel within the rail, but above the flatbed surface described above.

An aspect of the present design that is believed to set it apart from the prior art involves installation of the endless chain on the rail. As indicated above, whether the rail is extruded from a single length or is constructed from rail segments that are connected together in end-to-end fashion, the rail nevertheless has a "fixed length." As described above, because the end sprockets are also fixed in position, the rail plus sprockets define a fixed perimeter path of travel having a certain fixed length.

The endless chain is "endless" after installation. Prior to installation, the chain is a single length having ends that need to be conventionally linked together. The chain is installed on the above rail configuration with a chain length that is sufficiently short, or shorter, so that the free ends of the chain cannot be connected together unless the chain itself is stretched in tension. The fixed initial length of the chain (prior to installation) relative to the fixed perimeter path of travel described above is slightly less than a chain length that would be required to create slack in the chain, if the chain had been installed along the same perimeter path of travel. This difference, or limitation, means that the endless chain is installed on the rail with a certain amount of tension at the time of installation. The tension at the time of installation eliminates a requirement for adjustable end sprockets that would otherwise take up chain slack during system installation. How this type of chain installation is accomplished will be described later in this disclosure.

Another aspect of the present design involves including an elongated metal strip, or metal strip segment, as part of the endless chain. The strip, which can have a variable length from one implementation to another, provides an attachment point to the chain for a headboard that rides back-and-forth on the conveyor.

As a person skilled in the art would understand, the endless chain can be driven in one direction or another by a reversible motor such as, for example, a motor that drives one of the end sprockets described above. This would correspond to loading and unloading the system, respectively. The headboard prevents pallets or other kinds of loads from slipping or sliding along the rail system during loading or unloading sequences and/or transit of the load.

The foregoing will become better understood upon consideration of the following more detailed description that is to be taken in conjunction with the drawings that are part of the present disclosure.

BRIEF DESCRIPTION OF THE DRAWINGS

In the drawings, like reference numerals and letters refer to like parts throughout the various views, and wherein:

FIG. 9 is a cross-sectional view of the chain rail illustrated in FIG. 5 and in FIGS. 6-8;

FIG. 10 is labeled "prior art" and illustrates how an endless chain is typically installed on a rail when the chain is "slack" and with adjustable end sprockets that allow for subsequent tightening of the chain;

FIG. 11 is a schematic that illustrates installation of the chain in accordance with the present invention disclosure;

DETAILED DESCRIPTION

Figure 1:
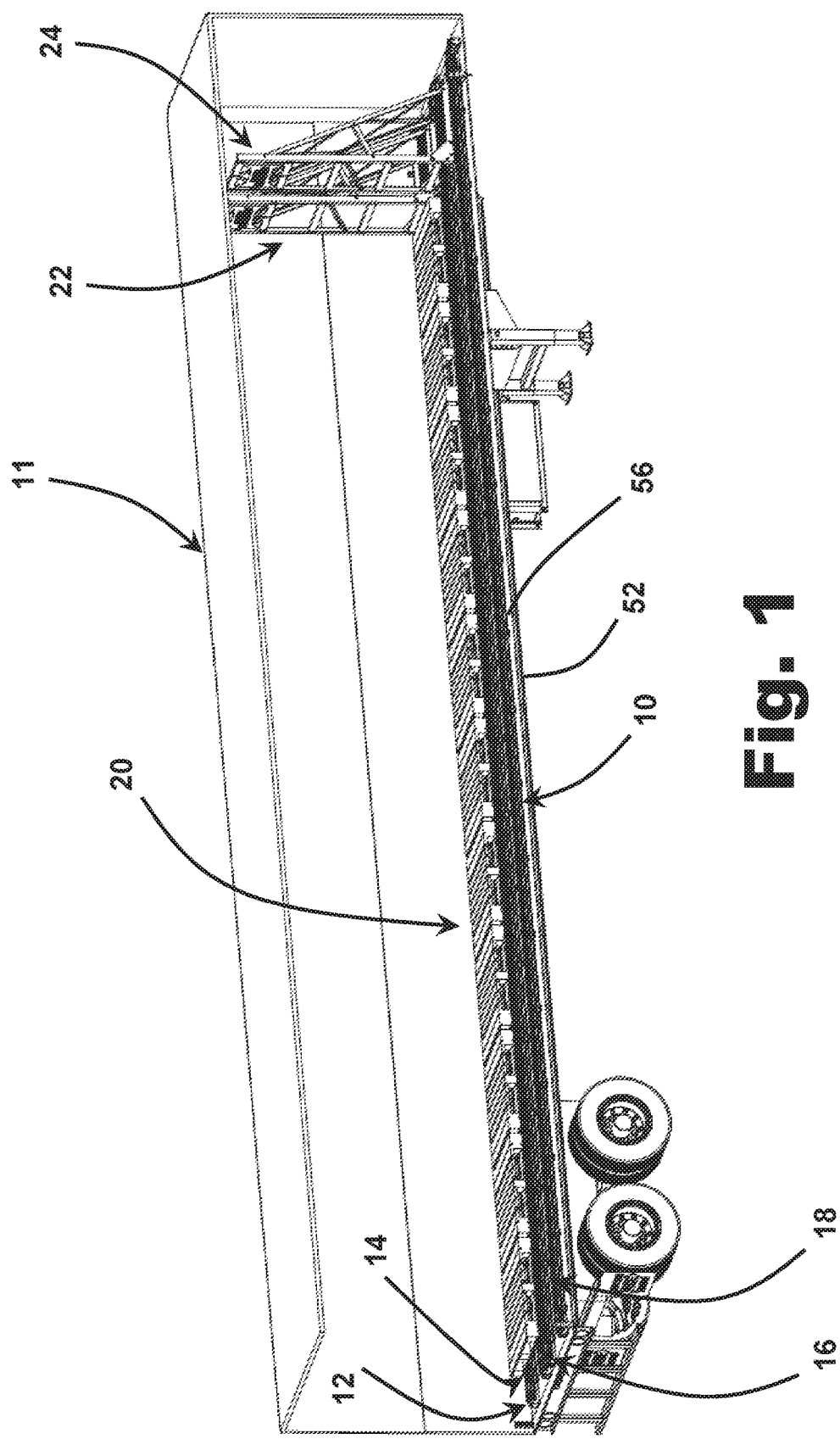
FIG. 1 is a pictorial view of a trailer with a conveyor system installed therein that is in accordance with the present disclosure.

Referring now to the drawings, and first to FIG. 1, shown generally at 10 is a chain rail load conveyor system constructed in accordance with the present disclosure. The conveyor system 10 is shown installed within the envelope of a conventional semi-truck trailer, indicated generally at 11.

As can be seen in the illustrations, the system 10 includes a plurality of rails 12, 14, 16, 18. The rails are divided into two pairs, one pair (12, 14) on one side of the trailer 11, and the other pair (16, 18) on the other side of the trailer. Each pair creates a conveyor track system for loading or unloading a row of pallets (indicated generally at 20 in FIG. 1) inside the trailer 11. The pallets 20 would, of course, each carry a load. The system illustrated in FIG. 1 allows two side-by-side palletized loads to be loaded, carried by, and then unloaded from the trailer 11. A pair of moving headboards, indicated generally at 22, 24, make up part of the system 10. The headboards 22, 24 are further described below.

Referring now to FIG. 9, reference numeral 26 generally refers to one of the four rails 12, 14, 16, 18 previously described. The rail 26 is a hollow extrusion that has an upper chain-carrying track, indicated generally by arrow 28. The upper track 28 is defined by extrusion walls 30, 32, 34. Resting within the upper track 28 is a plastic guide strip, indicated generally at 36.

The rail 26 also has a lower chain-carrying track that is indicated generally by arrow 38, which is similar to the upper track 28. The lower track 38 is inside the body of extruded rail 26. The lower track 38 is defined by extrusion walls 40, 42, 44. Resting within the lower track 38 is another plastic guide strip, indicated generally at 46. The upper and lower guide strips 36, 46 provide resting surfaces for an endless chain 48. The chain 48 protrudes upwardly above the rail 26 sufficiently to provide a surface upon which the pallets 20 rest.

Figure 3:
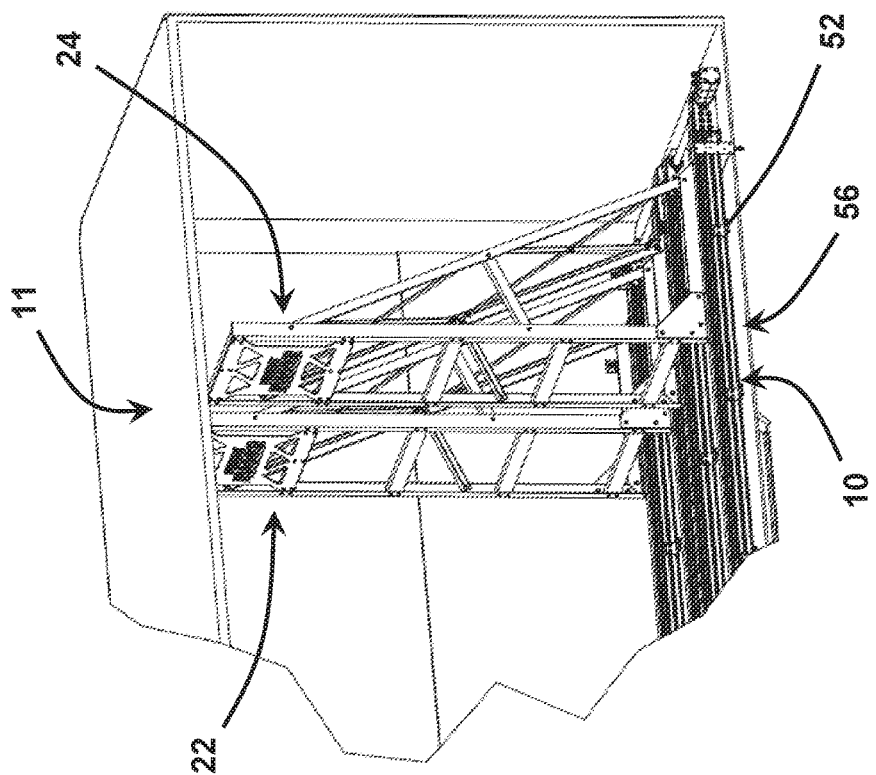
FIG. 3 is an enlarged view of the forward end of the trailer and conveyor system illustrated in FIG. 1.
Figure 2:
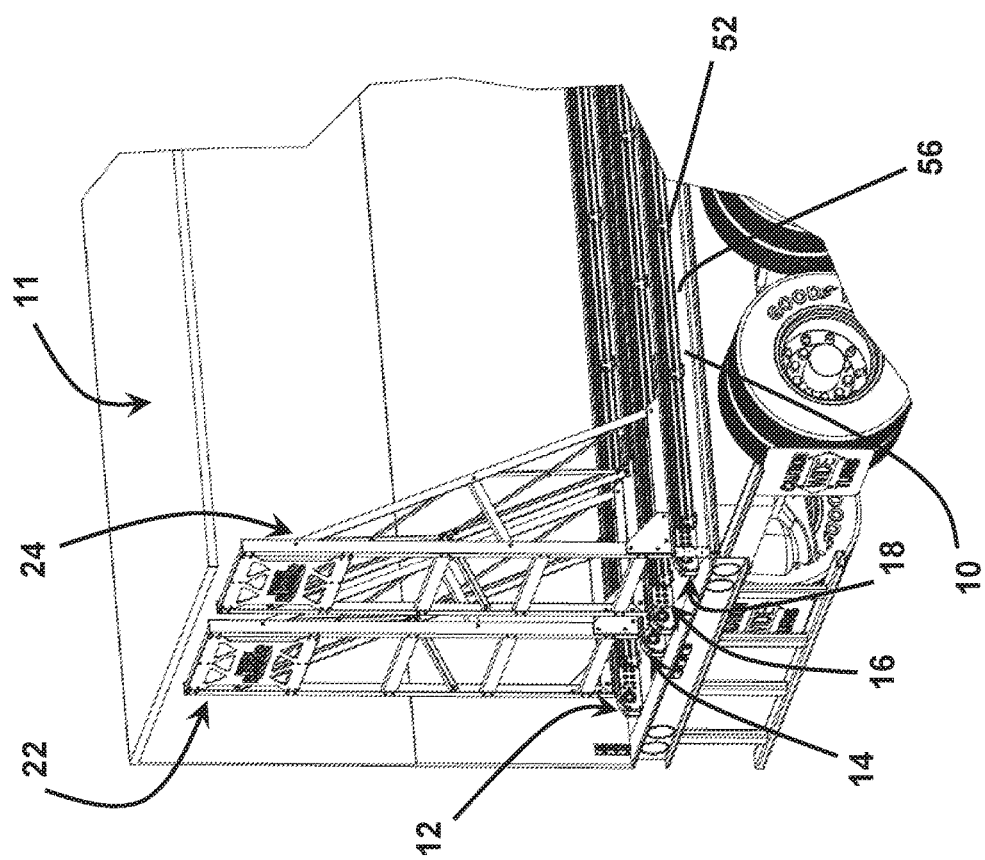
FIG. 2 is an enlarged view of the aft end of the trailer and conveyor system illustrated in FIG. 1.

The rail 26 has lengthwise channels 50 providing mounting bracket 52 attachment points, via fasteners 54. As shown in FIGS. 2 and 3, a plurality of mounting brackets 52 are used to mount the rails 12, 14, 16, 18 to the existing flatbed surface 56 in the trailer 11.

Figure 4:
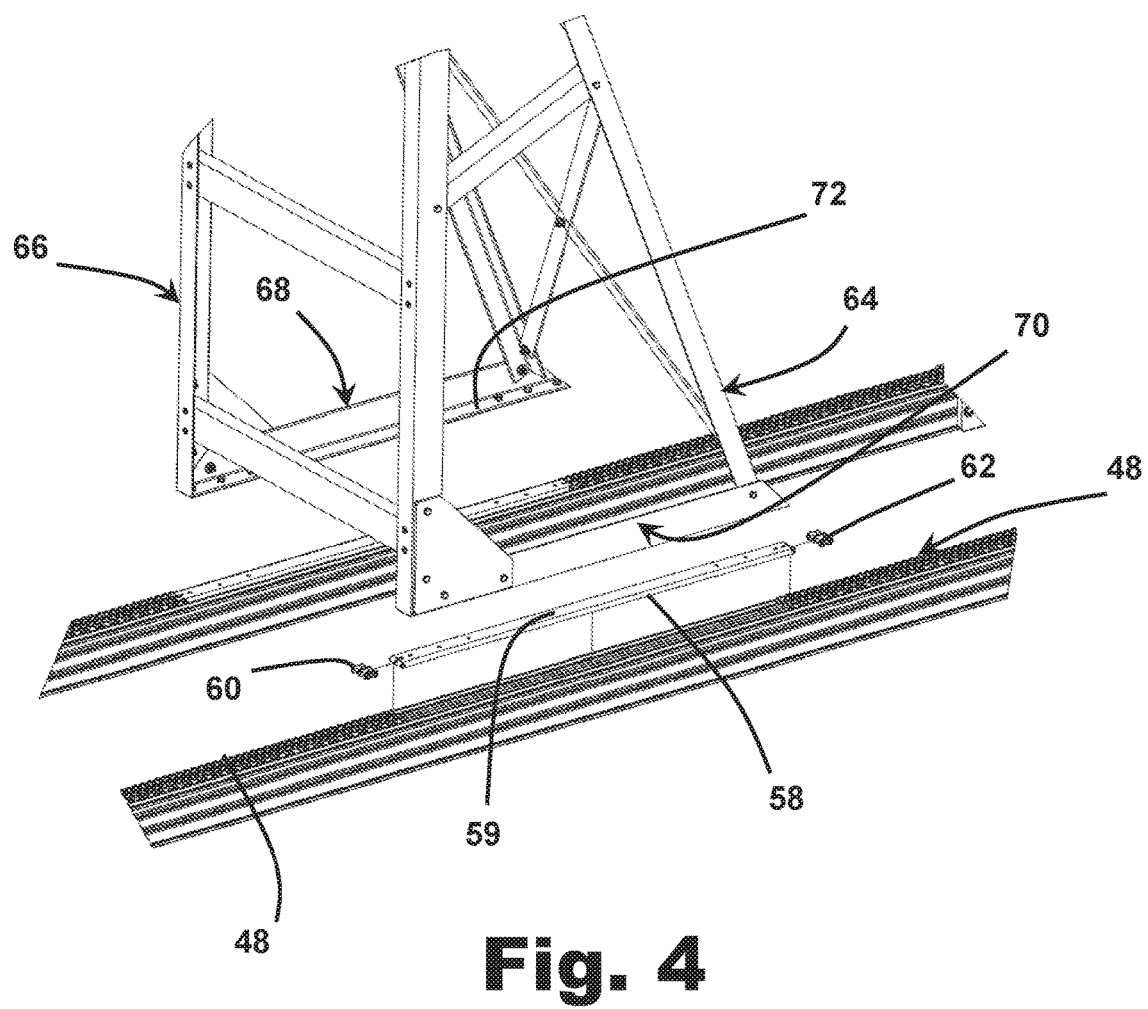
FIG. 4 is an enlarged, exploded view that shows the base legs of a moving headboard mounted to a metal strip in an endless chain.

Referring now to FIG. 4, each chain 48 in the system includes a metal bar or strip 58. The metal strip 58 is connected to the chain 48 by links 60, 62. The metal strip 58 provides a connection point or surface 59 for mounting a headboard side leg, indicated generally at 64, to the chain 48.

As is illustrated in FIG. 4, the system headboards 22, 24 each have a pair of side legs 64, 66 attached to one pair of rails. The base 68, 70 of each headboard side leg 64, 66 has a flat portion 72 that connects to the metal strip 58 on the chain. This causes each headboard 22, 24, to travel with movement of the endless chain 48 between the aft and forward end of the trailer 11, as is respectively shown in FIGS. 2 and 3.

Figure 5:
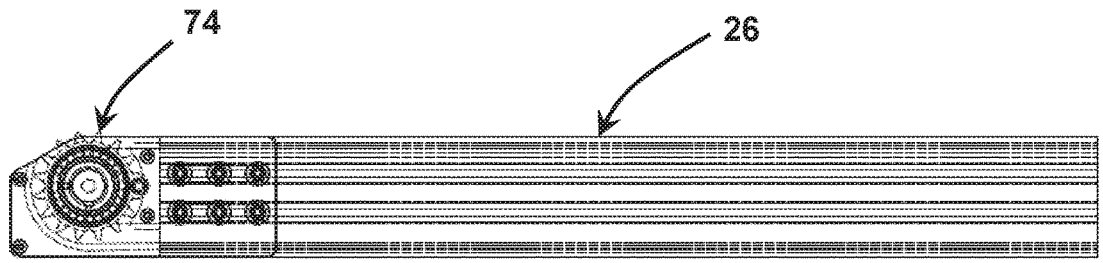
FIG. 5 is a side view of an end sprocket fixedly connected to a chain rail.
Figure 6:
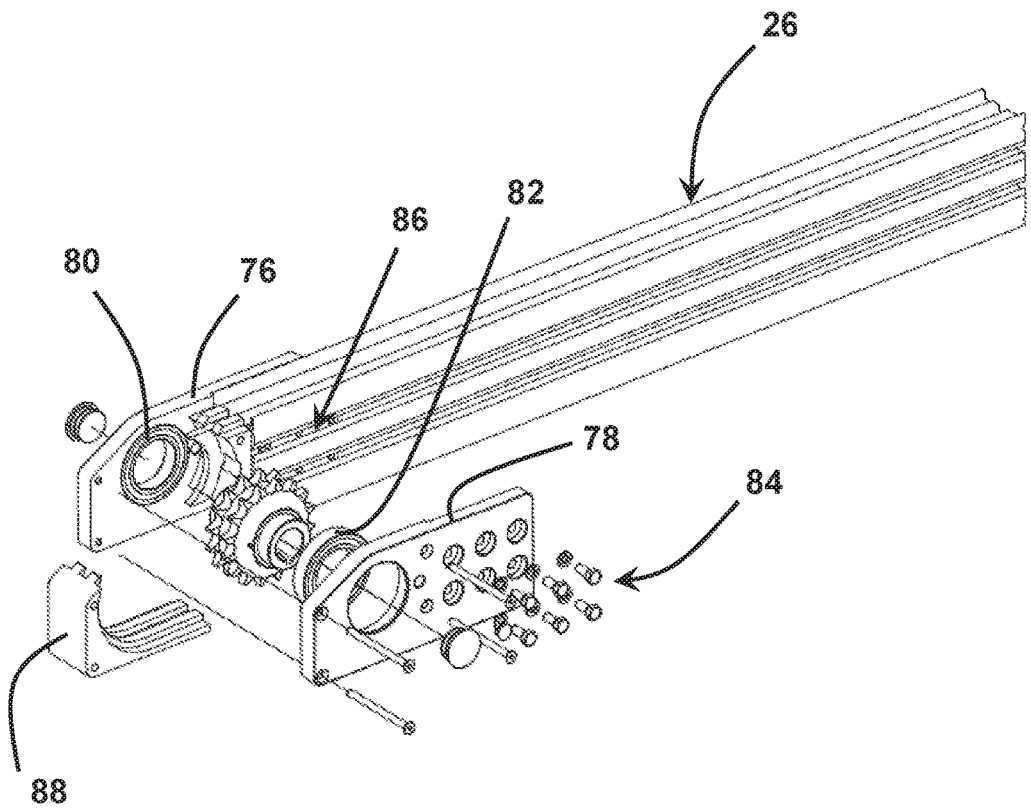
FIG. 6 is an exploded pictorial view of FIG. 5.

Referring now to FIG. 5, a fixed end sprocket 74 is connected adjacent to each end of the rail 26. The end sprocket 74 is supported by plates 76, 78, one on each side of the rail 26. Each plate 76, 78 has a bore that retains a bearing 80, 82 for rotational support of the end sprocket 74, on each side of the sprocket. The side plates 76, 78 are joined together by a plurality of fasteners, indicated generally at 84. The fasteners 84 extend through bores, indicated generally at 86, that are in the rail 26. This arrangement fixes the end sprocket 74 in position such that it cannot translate or move side-to-side relative to the length of the rail 26. Therefore, there is no adjustment that can be used as a chain tensioning mechanism. A shield 88 covers the end of the sprocket 74.

Figure 7:
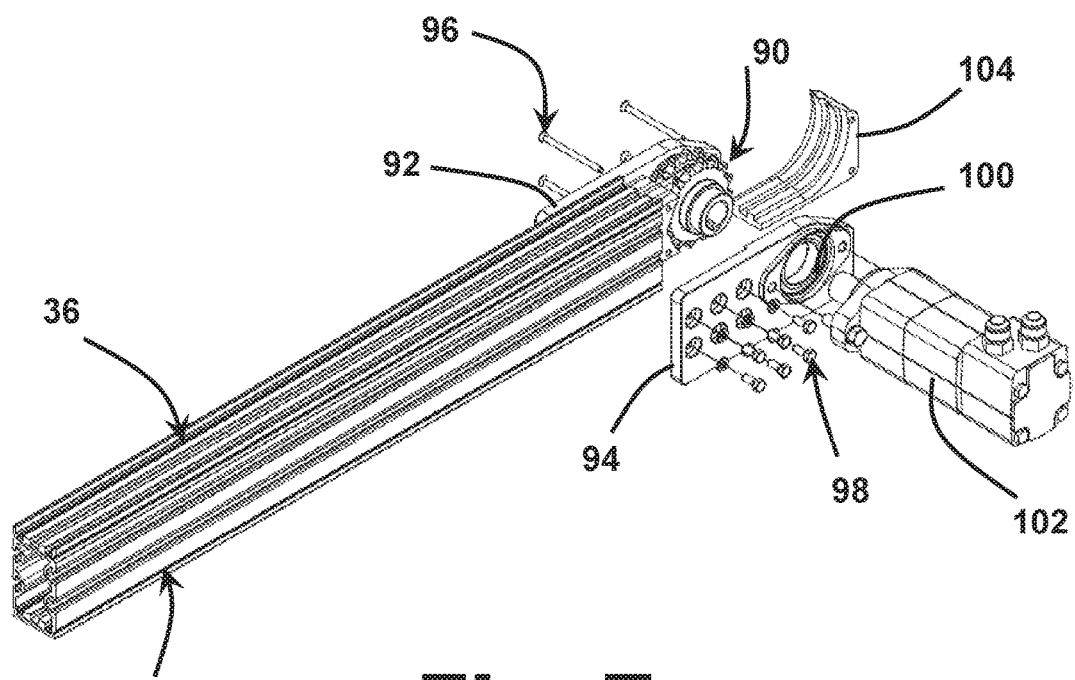
FIG. 7 is a pictorial view of the opposite end of the chain rail relative to the view illustrated in FIGS. 5 and 6, with the end sprocket and a drive motor shown in exploded view.
Figure 8:
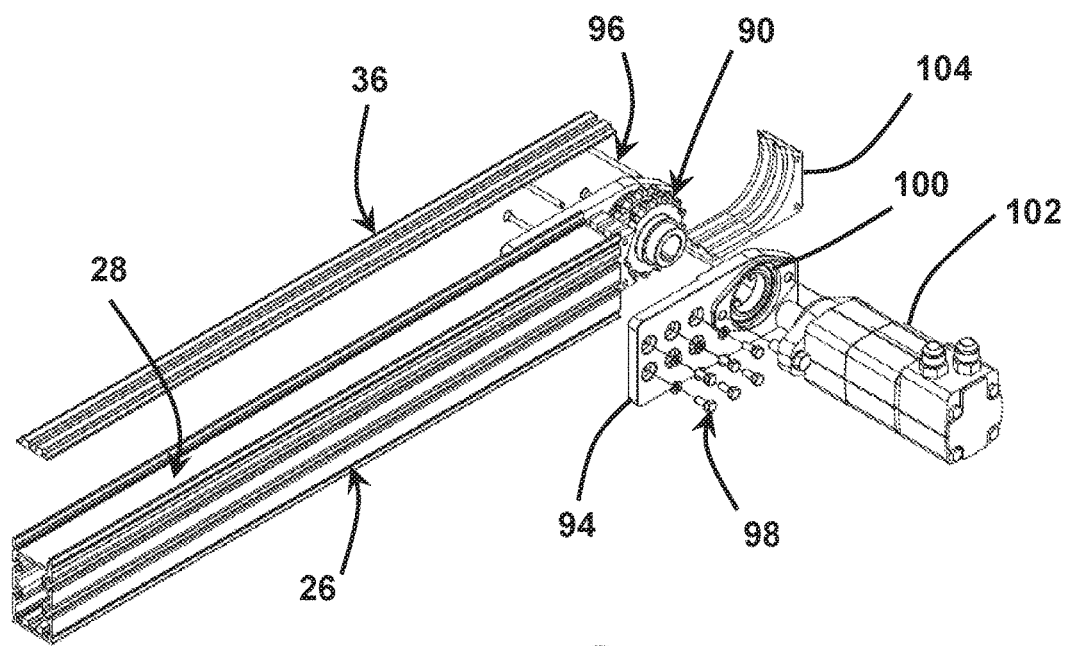
FIG. 8 is a view similar to FIG. 7, but shows a chain wear or chain guide strip exploded from the rail.

The other end of the rail 26 is illustrated in FIGS. 7 and 8. Directing attention there, the end sprocket 90 at the other end of the rail 26 is configured similarly. It is held in fixed position by two plates 92, 94 that are connected together via fasteners 96, 98. The end sprocket 90 is supported by a bearing 100 on each side. In this case, the end sprocket 90 is driven in rotation by a motor 102. The motor 102 shown in the drawings is a hydraulic motor, although other forms of motors could be used. A shield 104 covers the end sprocket 90.

As previously described, the upper and lower tracks 28, 38 of the rail 26 and the end sprockets 74, 90 define the path of travel for the chain 48. The measurement of the perimeter path of travel (that is, the minimum distance for chain travel and/or total chain length) will be a fixed length, because the end sprockets 74, 90 are fixed in position and do not move relative to the rail 26. Because the end sprockets 74, 90 are fixed in position, the distance of chain travel between the sprockets (or upper and lower tracks 28, 38) is also fixed in length.

Referring briefly to FIG. 10, which is labeled "prior art," an endless chain is typically installed with "slack" by adjustably moving one or more end sprockets inwardly a sufficient amount to place the chain on the rail. Then, one or the other sprocket is moved outwardly, as shown by arrow 104, to tighten the chain.

In the present case, however, and referring now to FIG. 11, the chain 48 is selected to have an initial length that is less than the normal minimum distance for chain travel around the rail 26. In other words, the initial length of the installed chain is insufficient relative to the chain's fixed or defined perimetrical path of travel, as described above. In preferred form, according to the present disclosure, the chain is installed on the rail 26 with a length that is slightly less than the chain length that would be required to create slack in the chain 48, if installed along the same perimeter path of travel. What this means is that the chain 48 is installed on the rail 26 and end sprockets 74, 90 in slight tension, so that it is unnecessary to later create tension via chain adjustment mechanisms. This eliminates the need for the adjustment of the position of the end sprockets 74, 90 (e.g., for chain tensioning after chain installation) and allows the end sprockets 74, 90 to be installed on the rail 26 in a fixed position that never moves.

Figure 12:
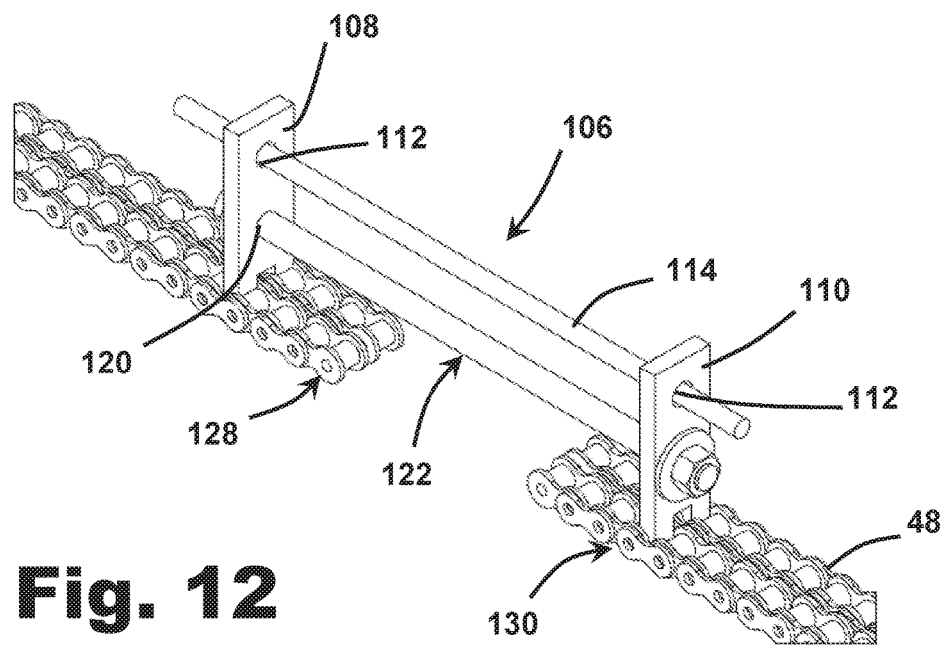
FIG. 12 is a pictorial view of an installation tool that enables installation of the endless chain in accordance with the present invention disclosure.
Figure 13:
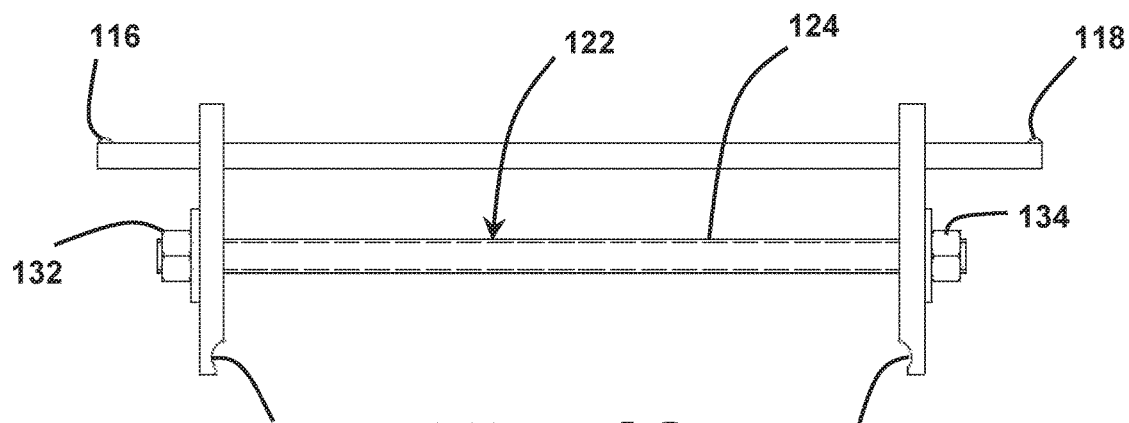
FIG. 13 is a side view of the installation tool illustrated in FIG. 12.

Installation of the chain 48 "in tension" is accomplished by a tool 106 that is illustrated in FIGS. 12 and 13. As seen in these two Figs., the tool 106 has plates 108, 110. Each plate has an upper bore 112 through which a rod 114 may slide. The rod 114 is retained by beads 116, 118 at each end of the rod. Each tool plate 108, 110 also has a lower bore 120 (see FIG. 12) through which an elongated all-thread 122 extends (or a similar elongated bolt with threads). The threads are schematically indicated at 124.

The bottom of each plate 108, 110 has a hook portion 126. The hook portions 126 engage with the links on opposite ends of the chain 48 (see, generally, arrows 128, 130 in FIG. 12). This is done when the chain 48 is initially installed on the rail 26 described above. At that point in time, the chain 48 is open-ended and not connected. One or the other of nuts 132, 134 is tightened which pulls the ends of the chains 128, 130 toward each other, putting the chain in tension, until the chain ends are sufficiently close to each other so that they can be connected by a master link. This causes the chain 48 to be installed on the chain rail "in tension," and with no slack, and with no requirement to adjust the position of the end sprockets 74, 90.

Figure 14:
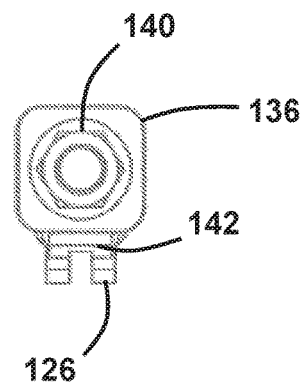
FIG. 14 is an end view of another embodiment of the installation tool illustrated in FIGS. 12-13.
Figure 15:
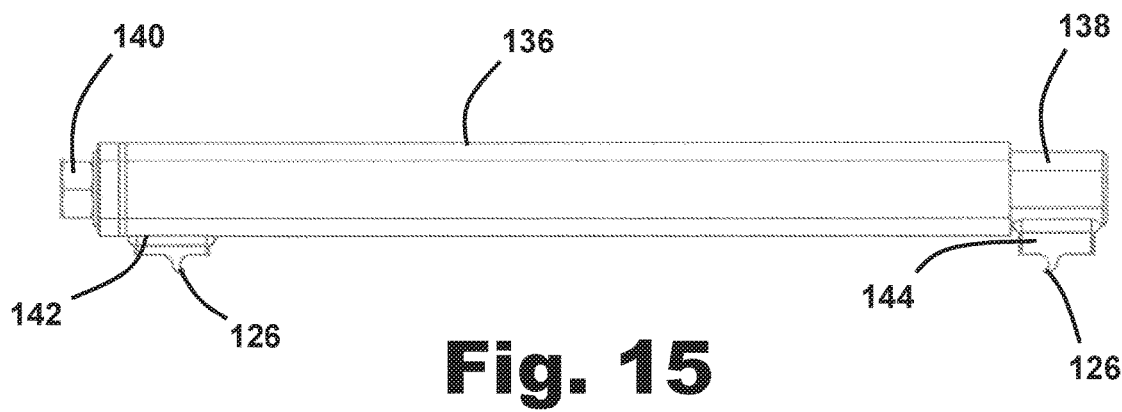
FIG. 15 is a side view of the embodiment illustrated in FIG. 14.
Figure 16:
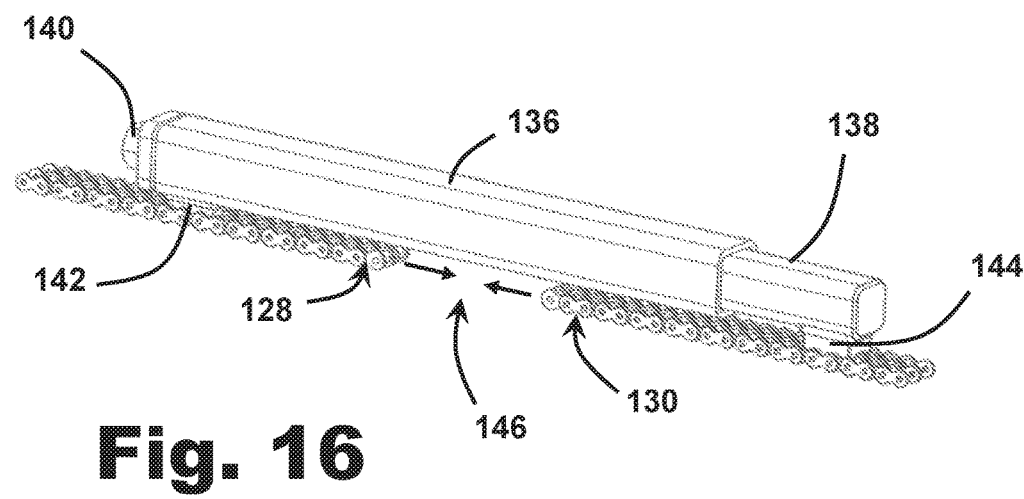
FIG. 16 is a pictorial view of the embodiment illustrated in FIGS. 14-15.

FIGS. 14-16 illustrate an upgraded version of the tool 106 previously described. In this instance, the tool 106 has outer and inner guide tubes 136, 138. The tubes 136, 138 can slide relative to each other and are removed by an "all-thread" or threaded bolt or rod that is inside the tubes 136, 138, similar to what was described above relative to the tool configuration illustrated in FIGS. 12-13. Turning nut 140 moves the guide tubes 136, 138 relative to each other for pulling the ends of the chain 48 toward each other, in the manner described above. Pulling blocks 142, 144 (see FIG. 15) are respectively welded to tubes 136, 138 to provide the hook portions 126 previously described. These parts can also be called "chain puller arms." In this embodiment, approximately 10 to 12 chain links would be in front of each puller arm 142, 144 as the tool is used to pull the ends 128, 130 of the chain 48 together (see arrows 146) until the master link can be installed.

A person skilled in the art would understand that the length of the chain 48 would need to be sized appropriately in order for the above tool connection method to work properly. An advantage to this design is that the elimination of any tightening mechanism that would otherwise be required for an end sprocket is eliminated. This allows the rail 26 to be manufactured with a lower profile relative to the existing flatbed surface 56, which is advantageous.

Figure 17:
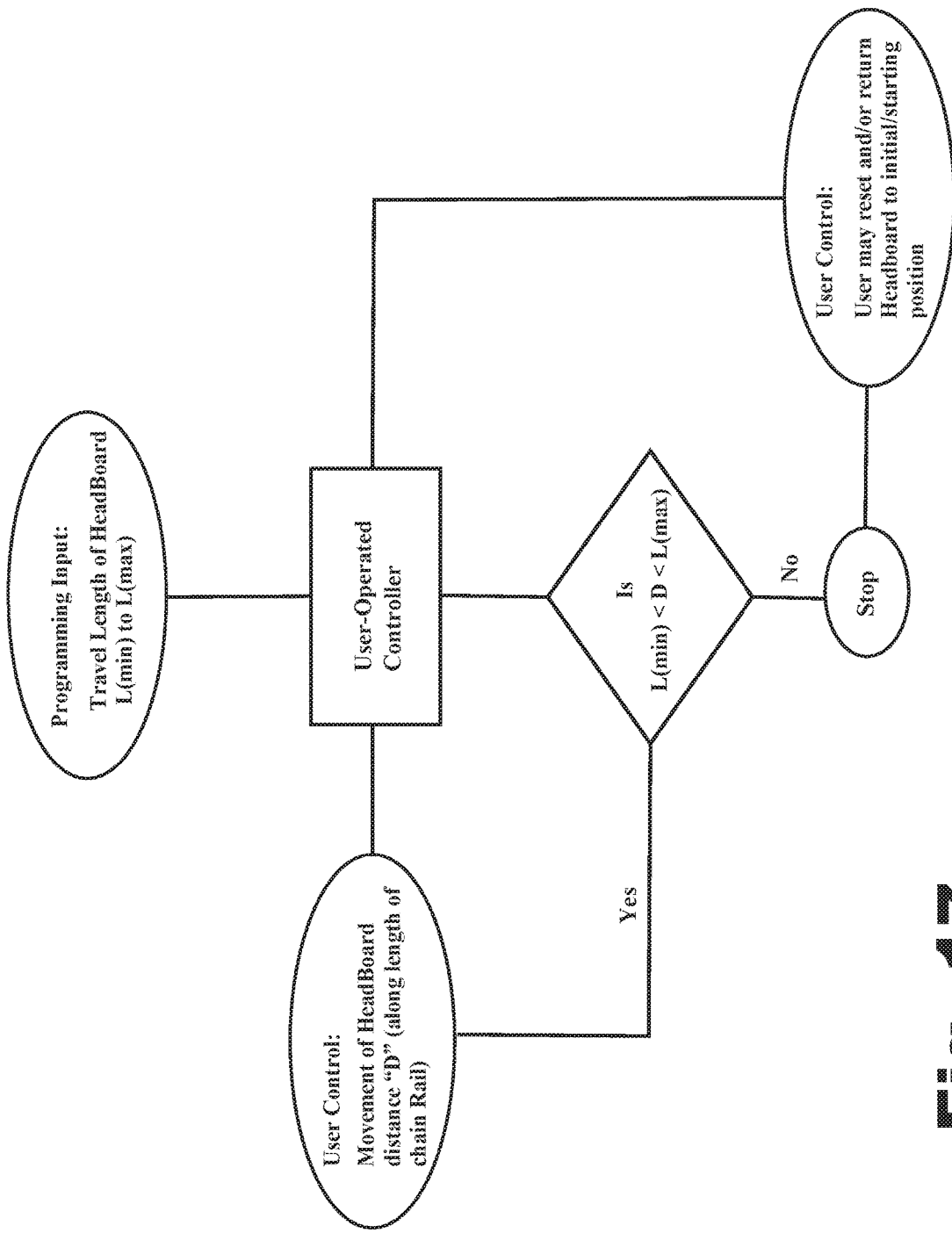
FIG. 17 is a flowchart that schematically illustrates rudimentary control of a conveyor system.

Finally, FIG. 17 illustrates a control sequence for the chain 48 as it rides on the rail 26. Although the system that is described here is described as an "endless chain," it is to be appreciated that the chain moves a certain distance (with the headboards 22, 24 riding above the rails) and then reverses direction. This corresponds to loading or unloading actions, as the case may be. It is to be understood that it is important to have a means and proper controls for stopping chain travel at the appropriate time so that the headboards 22, 24 do not travel too far relative to the opposite ends of the chain rail system.

The foregoing description is not intended to be limiting in terms of patent rights. The scope of the patent right is to be limited solely by the patent claim or claims that follow, the interpretation of which is to be made in accordance with the well-established doctrines of patent claim interpretation.

What is claimed is:

1. An endless chain load conveyor system, comprising:
at least one elongated rail that is mountable to an existing flatbed surface, said rail having a fixed length, and further having an upper chain-carrying track and a lower chain-carrying track, and a pair of fixed position guide sprockets adjacent to each end of said rail;
an endless chain that rides on said upper and lower tracks and said guide sprockets, said upper and lower tracks and said guide sprockets establishing a perimeter path of travel that is followed by said endless chain when said endless chain moves, said sprockets guiding said chain between said upper and lower tracks, with said endless chain riding in said upper track in a manner that is sufficiently exposed so that a load can ride on and be conveyed above said upper track by said endless chain as said chain moves, and with said lower track providing a return path of travel for said chain, within said rail but above said flatbed surface; and wherein
said endless chain is installed on said rail with a fixed initial length relative to said perimeter path of travel that is slightly less than a chain length that would be required to create slack in the chain if installed along the same perimeter path of travel, in a manner so that the endless chain is installed on said rail with tension.

2. The endless chain load conveyor system of claim 1, wherein said elongated rail comprises a substantially continuous extrusion.

3. The endless chain load conveyor system of claim 1, wherein said elongated rail comprises a substantially continuous extrusion that extends substantially along the length of said flatbed surface.

4. The endless chain load conveyor system of claim 1, wherein said elongated rail comprises at least two rail segments butted together in end-to-end relationship to form a longer rail.

5. The endless chain load conveyor system of claim 1, wherein said flatbed surface comprises a floor in a trailer, and wherein said elongated rail comprises a substantially continuous extrusion that extends substantially along the length of said trailer floor.

6. The endless chain load conveyor system of claim 1, wherein said elongated rail comprises at least two rail segments butted together in end-to-end relationship to form a longer rail.

7. The endless chain load conveyor system of claim 1, wherein said endless chain includes an elongated metal strip for mounting a headboard to said chain.

8. The endless chain load conveyor system of claim 7, wherein a side leg of a headboard is connected to said elongated metal strip.

9. The endless chain conveyor system of claim 7, including a pair of elongated rails, each rail carrying an endless chain for moving a palletized load along said pair of rails, each endless chain having an elongated metal strip for connecting a side leg of said headboard to said chain, in a manner so that said headboard spans the distance between said rails.

10. The endless chain load conveyor system of claim 1, including a reversible motor connected to one of said sprockets for moving said endless chain in one of two directions.

11. An endless chain load conveyor system, comprising:
at least one elongated rail that is mountable to an existing flatbed surface, said rail having a fixed length, and further having an upper chain-carrying track and a lower chain-carrying track, and a pair of fixed position guide sprockets adjacent to each end of said rail;
an endless chain that rides on said upper and lower tracks and said guide sprockets, said upper and lower tracks and said guide sprockets establishing a perimeter path of travel that is followed by said endless chain when said endless chain moves, said sprockets guiding said chain between said upper and lower tracks, with said endless chain riding in said upper track in a manner that is sufficiently exposed so that a load can ride on and be conveyed above said upper track by said endless chain as said chain moves, and with said lower track providing a return path of travel for said chain within said rail but above said flatbed surface; and wherein
said endless chain is installed on said rail with a fixed initial length relative to said perimeter path of travel that is slightly less than a chain length that would be required to create slack in the chain if installed along the same perimeter path of travel, in a manner so that the endless chain is installed on said rail with tension; and wherein
said endless chain includes an elongated metal strip for mounting a headboard to said chain, and with a side leg of said headboard being connected to said elongated metal strip, in a manner so that said headboard moves with said endless chain.

12. The endless chain load conveyor system of claim 11, wherein said elongated rail comprises a substantially continuous extrusion.

13. The endless chain load conveyor system of claim 11, wherein said elongated rail comprises a substantially continuous extrusion that extends substantially along the length of said flatbed surface.

14. The endless chain load conveyor system of claim 11, wherein said flatbed surface comprises a floor in a trailer, and wherein said elongated rail comprises a substantially continuous extrusion that extends substantially along the length of said flatbed surface.

15. The endless chain load conveyor system of claim 11, wherein said elongated rail comprises at least two rail segments butted together in end-to-end relationship to form a longer rail.

16. The endless chain conveyor system of claim 7, including a pair of elongated rails, each rail carrying an endless chain for moving a palletized load along said pair of rails, each endless chain having an elongated metal strip for connecting a side leg of said headboard to said chain, in a manner so that said headboard spans the distance between said rails.

17. The endless chain load conveyor system of claim 1, including a reversible motor connected to one of said sprockets for moving said endless chain in one of two directions.

18. A method for installing an endless chain on a conveyor rail in a conveyor system, comprising:
providing at least one rail member for carrying an endless chain, said rail having a fixed length of chain travel along a rail perimeter path of travel that cannot be adjusted after the rail is installed on a floor surface; and
installing a fixed length chain in tension on said rail, by pulling free ends of said chain toward each other until said ends can be linked together, and wherein the length of said installed chain is not greater than said fixed length of chain travel along said rail perimeter path of travel.

* * * * *